United States Patent Office 3,006,599
Patented Oct. 31, 1961

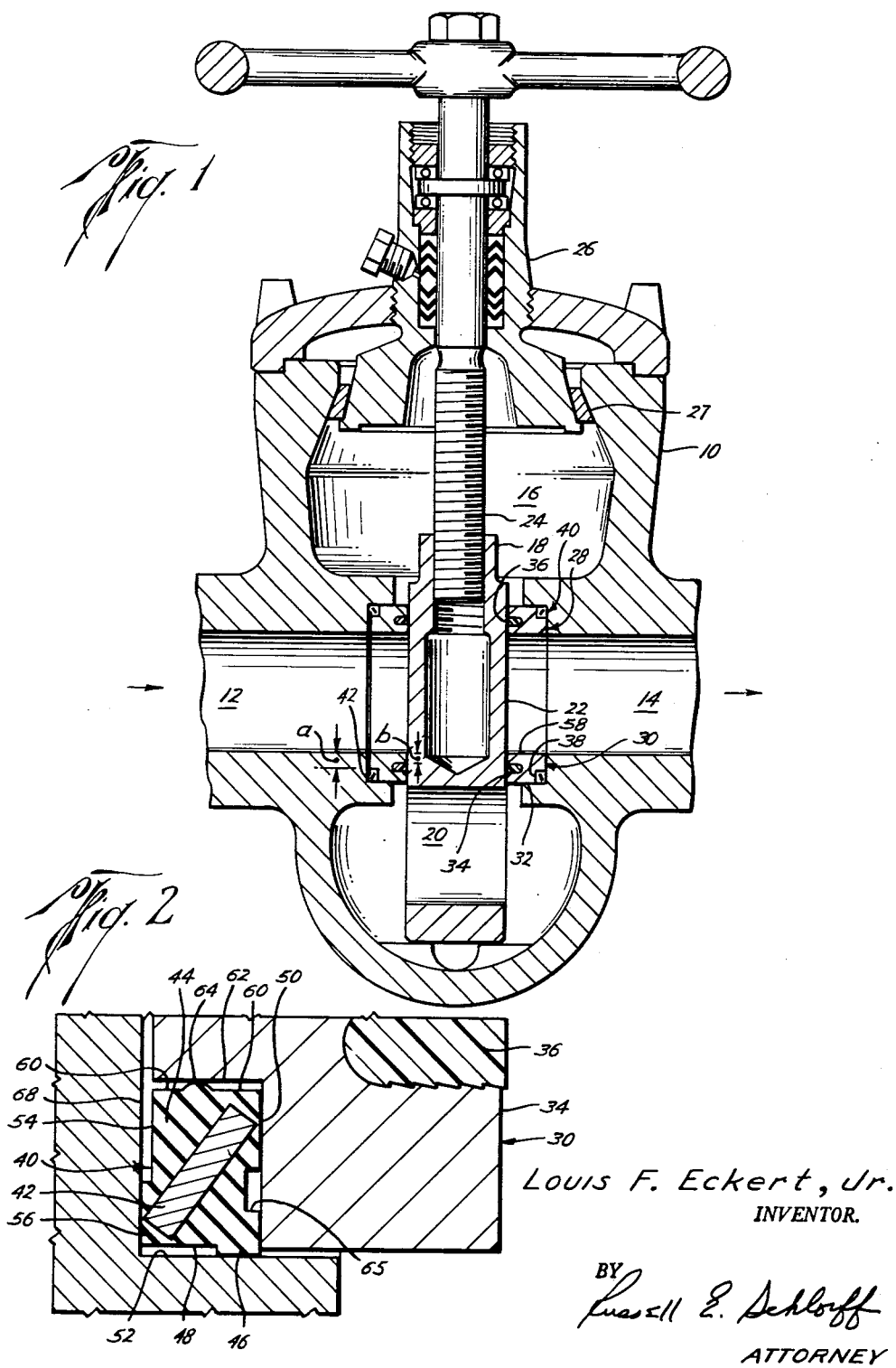

3,006,599
VALVE SEAT
Louis F. Eckert, Jr., Houston, Tex., assignor to ACF Industries, Incorporated, New York, N.Y., a corporation of New Jersey
Filed July 20, 1959, Ser. No. 828,363
6 Claims. (Cl. 251—172)

This invention relates generally to gate valves; more particularly to a novel through conduit slab gate valve having a spring loaded rear seal.

Through conduit gate valves are widely used because of their desirable flow characteristics. When in the open position, a straight through passage is provided which offers no appreciable resistance to fluid flow. Also, the seats are protected against abrasive action in the fully open and full closed positions.

Through conduit gate valves have a housing which is provided with opposed flow ports with a valve chamber therebetween. A sliding gate mechanism is positioned in the valve chamber. The gate is provided with a solid portion which blocks the flow in the closed position and a ported portion which aligns with the opposed flow ports in the open position. The inner ends of the opposed flow ports are provided with recesses in which are positioned annular rings forming the seats for the valves. Since the ported portion of the gate is aligned with the flow ports in the open position, the seats are protected from abrasive action of the lading flowing through the valve. In the valve of the present invention, the seat is fitted loosely into the annular recess and the back of the seat is provided with a rubber covered Belleville spring. Upon assembly, the spring provides sufficient force to bring the face of the seat into initial contact with the gate. This load is sufficient to obtain a low pressure seal. As pressure is introduced into the upstream bore with the gate in the closed position, the upstream seat is forced into more intimate contact establishing a high pressure seal. This intimate contact is a result of the rear seal forming a seal around the circumference of the seat so that pressure in the upstream bore acts against the back of the seat and pushes the seat forward against the gate. On the downstream side, the rear seal acts as a compression seal. As pressure increases, the load on the seal increases until the back of the seat contacts the back wall of the recess at which time the seal responds as an O-ring.

By utilizing a face seal of smaller diameter than the sealing diameter of the rear seal, there is a differential area on which pressure in the valve chamber can exert a force to push the seat away from the gate whereby excessive body pressure will be relieved into the upstream bore.

It is the purpose of the present invention to provide a novel type slab gate valve with seats having a rear seal providing an initial load to establish a seal between the face of the seat and gate, the seal on the face of the seat being of lesser diameter than the rear seal, the rear seal acting as a seal between the seat and pocket to make the upstream seat a pressure acting seat.

Another object of the present invention is to provide a novel rubber covered rear seal which acts as a spring to load the seat and also seals around the seat pocket.

A further object of the present invention is to provide a novel seat for a slab type through conduit gate valve which on the upstream side acts as a pressure acting seat and which on the downstream side forms a compression seal with the seat recess.

It is a further object to provide a novel seat for a slab type through conduit gate valve which on the upstream side will be pressure acting and which will relieve excessive body pressure to the upstream bore.

It is still a further object to provide a spring member for a gate valve seat which is molded in a protective cover to prevent corrosive action of line fluid.

A specific object is to provide a novel rear seal for a gate valve seat member which establishes a seal between the seat and seat recess and between the seat and rear seal, and has provision for displacement of rubber when on the downstream side.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description and is shown in the accompanying drawing forming a part of the specification, wherein:

FIG. 1 is a cross sectional view of a novel slab type gate valve incorporating a seat having a rear seal which acts to apply initial load and thereafter creates a pressure acting upstream seat.

FIG. 2 is an enlarged cross sectional view of the rear seal member and recess shown in FIG. 1.

Referring now to the drawings, there is shown in FIG. 1 a novel through conduit type slab gate valve. The valve has a body 10 having aligned flow passages 12 and 14. The outer ends of the passages 12 and 14 terminate in any of the various well known means for finishing ends for connection to a flow system. The interior of the body 10 is provided with a valve chamber 16 to receive a movable gate member 18. The gate member consists of a substantially flat metal plte hving a passage 20 adapted to register with the passages 12 and 14 in the valve open position and a solid portion 22 to cover the passages 12 and 14 in valve closed position, the position shown in FIG. 1. The upper end of the gate is attached to a stem 24 for raising and lowering the gate member as is well known in the art. The gate 18 is not rigidly attached to the stem and will move over against the downstream side on application of pressure. The stem 24 extends through a bonnet 26 which closes the valve chamber 16. The connection between the bonnet and the valve body is a pressure sealing joint 27 which is fully described in Laurent U.S. Patent 2,582,996. Any other type of bonnet connection may be used.

The end of the flow passages 12 and 14 adjacent the valve chamber 16 are machined to form annular recesses 28—28. The pockets are formed coaxially with the flow passages and receive seat members 30—30.

Each seat member 30 has an annular hub portion 32 which telescopes into its annular recess 28 in sliding engagement. Each seat member is also provided with a flat face portion 34 opposing the gate 18. The face portion 34 has an annular resilient plastic insert 36 which extends slightly above the surface of the face portion 34. The annular resilient member 36 establishes the primary seal between the seat 30 and gate 18. The end of the annular portion 32 which is in the pocket 28 is of reduced diameter to form a pocket 38 in which is positioned a rear seal member 40.

The rear seal 40 is comprised of a Belleville spring 42 molded in a rubber covering 44. The Belleville spring 42 extends outward from the inner forward corner of the pocket 38 to the outer rear corner of the recess 28, see FIG. 2. The rubber covering 44 may be formed of natural rubber or any of the well known synthetic rubbers such as Hycar or neoprene. While the rubber surrounding the Belleville spring 42 is generally rectangular in cross section, see FIG. 2, it has certain configurations which control the operational characteristics of the seal 40 as will be explained subsequently. As previously mentioned, the spring 42 provides sufficient load to the seat 30 to establish an initial seal between the annular resilient insert 36 and the gate 18, and the rubber covering 44 establishes a seal with the pocket 28 so that as upstream line fluid flows in back of the upstream seat 30 the pressure acts on the back of the seat to move the face of the seat into intimate contact with the gate 18. On the downstream side, the rubber covering 44 forms a seal with the pocket 28 so that there is no leakage of fluid between the seat and pocket. To establish these seals, particularly on the upstream side, there is a corner 46 which extends beyond the remainder of the outer periphery 48 and face 50. Therefore, with the decreased diameter 48 giving pressure a chance to take hold and build up, this corner 46 functions as an O-ring and establishes a seal with the outer wall 52 of the pocket 28. With the establishment of the seal with the pocket, the seat 30 will move forward to increase its engagement wtih the face of the gate 18. In order to get pressure behind the seat so that the seat can operate as a pressure actuated seat, the rear face 54 of the seal does not extend as far back as the spring containing corner 56. Since the effective area $a$ between the spring containing corner 56 and bore 58 of the seat is greater than the area $b$ between the bore 58 and annular insert 36, there is established a pressure differential area so that when there is pressure behind the seat 30 there will always be a moment causing movement of seat 30 toward the gate 18. So that pressure can not channel around the inner periphery 60 of the seal and wall 62 of the seat 28, the inner periphery 60 is provided with a raised portion 64 which establishes a seal with the wall 62. To provide for displacement of rubber on the downstream side when the seal 40 is acting as a compression seal, the face 50 is provided with a notch 65 and the rear face 54 does not extend to the plane of the spring containing corner 56.

With the valve closed, the position shown in FIG. 1, the spring 42 forces the seat 28 toward the gate 18 with a sufficient pressure to cause an initial seal between the annular insert 36 and gate 18. The spring load thus created holds the seat 28 slightly away from the rear wall 68 of the pocket 28. As pressure builds up in the upstream passageway 12 and bore 58, it will act between the rear face of the upstream seat and wall 68. Since the rear face 54 of the seal 30 is relieved, the line fluid will act over the entire area extending to the spring containing corner 56. At the same time, the line fluid will act between the face 34 of the seat 30 and gate 18 until it reaches the annular insert 36. As previously mentioned, the effective area $b$ between the bore 58 and insert 36 is less than the area $a$ which is between the bore 58 and spring containing corner 56. Accordingly, since the area at the rear of the seat subject to pressure is greater than the area at the face of the seat subject to pressure, the effective result will be to move the seat 30 against the face of the gate 18. As the spring containing corner 56 is moved from contact with the rear wall 68 of the seat pocket 28, a new seal is formed between the corner 46 and annular wall 52 which provides a further increase in differential area and a resultant greater force toward the gate 18. When the seat 30 has so moved, the seal between the recess 28 and seat 30 is that established by the corner 46 and outer wall 52 of the pocket. The fit between the seat 30 and recess 28 is a sliding fit so that the seat 30 can easily move upon application of pressure. The upstream seal just described will permit the valve to be used for block and bleed service where an upstream seal is necessary. Also, with an effective upstream seal, the stem can be changed while the valve is on the line under pressure.

As previously mentioned, the gate 18 will move over toward the downstream side 14 forcing the downstream seat 30 into its recess 28 until the back of the seat 30 abuts against the rear wall of the downstream recess. In this position, the rubber is not completely deformed nor is the spring 42 overstressed. As the downstream seat 30 is moved into the recess 28, the seal 40 is deformed forming a tight seal with the annular wall of the recess so that there can be no flow around the seat. In order to accommodate the rubber displaced by such mashing, the rear seal 40 is provided with a notch 65 and relieved rear wall portion 54. When the seat 30 has moved to the back of the recess, the rear seal 40 is sufficiently deformed so that it will almost completely fill the pocket 38 and will thereafter act as an O-ring to seal against any flow around the wall of the recess 28.

The annular resilient insert 36 on the front face 34 of the seat 30 is of a smaller diameter than the seal 40 and when the valve is in the closed position body pressure will act on the area between the insert 36 and circumferential edge of the seal. As the body pressure builds up, it will overcome the force pressing the seat forward which is balanced in part by the area between the bore 58 and insert 36 and the annular insert 36 will break contact with the face of the gate 18 relieving the excessive body pressure into the upstream bore. Such breaking of contact will be momentary and upon relief of the excessive pressure the seat will again be forced into intimate sealing contact with the gate 18.

As can be seen from the above, the utilization of the rear seal of the present invention provides on the upstream side of a slab type through conduit gate valve a pressure actuated seat which increases its sealing engagement with an increase of upstream pressure. Also, a tight downstream seal is provided. Moreover, on an excessive increase of body pressure there is an automatic relief into the upstream bore. The valve can be used as a two way valve, that is, pressure can be applied from either side.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. A gate valve formed of a housing with a bore therethrough, a valve chamber intersecting said bore, valve gate mechanism in said chamber, facing annular recesses surrounding said bore, seat members positioned in said recesses, each said seat member comprising: an annular ring of a lesser diameter than the annular recess whereby it loosely fits in said recess, the face of the annular ring opposing the rear wall of the recess being of reduced diameter to form a pocket, a rubber covered Belleville spring forming a rear seal positioned in said pocket, an annular resilient sealing member extending from the face of the seat opposing the gate, the rear seal applying initial load to the seat to form an initial seal with the gate and thereafter forming a seal around the recess so that as pressure in the upstream bore increases the force of the upstream seat against the gate will be correspondingly increased.

2. A gate valve formed of a housing with a bore therethrough, a valve chamber intersecting said bore, valve gate mechanism in said chamber, facing annular recesses surrounding said bore, seat members positioned in said recesses, each said seat member comprising: an annular ring of a lesser diameter than the annular recess whereby it loosely fits in said recess, the face of the annular ring opposing the rear wall of the recess being of reduced diameter to form a pocket, a rubber covered Belleville spring forming a rear seal positioned in said pocket, an annular resilient sealing member extending from the face of the seat opposing the gate, the annular resilient sealing member being of a smaller diameter than the seat whereby any entrapped pressure in the body can act on the area between the annular resilient sealing member and circumference of the seat of the upstream side and if excessive overocem the pressure exerted toward the gate by upstream fluid breaking momentarily the contact of the upstream annular resilient sealing member and gate and relieve excessive body pressure into the upstream bore.

3. A gate valve formed of a housing with a bore therethrough, a valve chamber intersecting said bore, valve gate mechanism in said chamber, facing annular recesses surrounding said bore, seat members positioned in said recesses, each said seat member comprising: an annular ring of a lesser diameter than the annular recess whereby it loosely fits in said recess, the face of the annular ring opposing the rear wall of the recess being of reduced diameter to form a pocket, a rear seal positioned in said pocket, an annular resilient sealing member extending from the face of the seat opposing the gate, the rear seal being formed of a Belleville spring molded in a generally rectangular rubber covering, the rubber covering having a portion forming a seal with the circumferential wall of the recess, a portion forming a seal with the rear wall of the recess and a portion forming a seal with the circumferential wall of the pocket.

4. A gate valve formed of a housing with a bore therethrough, a valve chamber intersecting said bore, valve gate mechanism in said chamber, facing annular recesses surrounding said bore, seat members positioned in said recesses, each said seat member comprising: an annular ring of a lesser diameter than the annular recess whereby it loosely fits in said recess, the face of the annular ring opposing the rear wall of the recess being of reduced diameter to form a pocket, a rear seal positioned in said pocket, an annular resilient sealing member extending from the face of the seat opposing the gate, the rear seal being formed of a Belleville spring molded in a generally rectangular rubber covering, the rubber covering having a spring containing corner forming a seal with the rear wall of the recess, the remainder of the rear wall of the rubber covering being relieved, the rubber covering having a raised portion forming a seal with the circumferential wall of the pocket, the rubber covering also having a forward corner forming a seal with the circumferential wall of the recess.

5. A gate valve formed of a housing with a bore therethrough, a valve chamber intersecting said bore, valve gate mechanism in said chamber, facing annular recesses surrounding said bore, seat members positioned in said recesses, each said seat member comprising: an annular ring of a lesser diameter than the annular recess whereby it loosely fits in said recess, the face of the annular ring opposing the rear wall of the recess being of reduced diameter to form a pocket, a rear seal positioned in said pocket, an annular resilient sealing member extending from the face of the seat opposing the gate, the rear seal being formed of a Belleville spring molded in a generally rectangular rubber covering, the Belleville spring extending outward from the inner forward corner of the pocket to the outer rear corner of the recess, the outer rear corner of the pocket establishing a seal with the rear wall of the recess, the forward inner corner of the covering of the seal forming a seal with the side wall of the recess, a raised formation on the inner wall of the covering forming a seal with the side wall of the seat.

6. A gate valve formed of a housing with a bore therethrough, a valve chamber intersecting said bore, valve gate mechanism in said chamber, facing annular recesses surrounding said bore, seat members positioned in said recesses, each said seat member comprising: an annular ring of a lesser diameter than the annular recess whereby it loosely fits in said recess, the face of the annular ring opposing the rear wall of the recess being of reduced diameter to form a pocket, a rubber covered Belleville spring forming a rear seal positioned in said recess, an annular resilient sealing member extending from the face of the seat opposing the gate, the rear seal applying initial load to the seat to form an initial seal with the gate and being provided with means to form a tight seal between the pocket and recess so that thereafter the upstream seat becomes pressure actuated so that as pressure in the upstream bore increases the force of the seat against the gate will be correspondingly increased.

References Cited in the file of this patent

UNITED STATES PATENTS

| | | |
|---|---|---|
| 2,030,458 | McKellar | Feb. 11, 1936 |
| 2,201,895 | Glen | May 21, 1940 |
| 2,297,161 | Newton | Sept. 29, 1942 |
| 2,373,628 | Gleeson | Apr. 10, 1945 |
| 2,529,412 | Parker | Nov. 7, 1950 |
| 2,868,497 | Graham | Jan. 13, 1959 |
| 2,900,165 | Badger | Aug. 18, 1959 |